United States Patent [19]

Namimoto

[11] 4,096,572

[45] Jun. 20, 1978

[54] COMPUTER SYSTEM WITH A MEMORY ACCESS ARBITRATOR

[75] Inventor: Keiji Namimoto, Yokohama, Japan

[73] Assignee: Tokyo Shibaura Electric Co., Ltd., Kawasaki, Japan

[21] Appl. No.: 727,356

[22] Filed: Sep. 28, 1976

[30] Foreign Application Priority Data

Sep. 30, 1975  Japan .............................. 50-117912

[51] Int. Cl.$^2$ .......................... G06F 9/18; G06F 13/00
[52] U.S. Cl. .................................................. 364/200
[58] Field of Search .................... 364/200 MS File

[56] References Cited

U.S. PATENT DOCUMENTS

| | | | |
|---|---|---|---|
| 3,242,467 | 3/1966 | Lamy | 364/200 |
| 3,421,150 | 1/1969 | Quosig et al. | 364/200 |
| 3,445,822 | 5/1969 | Driscoll | 364/200 |
| 3,706,077 | 12/1972 | Takashimori et al. | 364/200 |
| 3,715,729 | 2/1973 | Mercy | 364/200 |
| 3,761,879 | 9/1973 | Brandsma | 364/200 |
| 3,775,754 | 11/1973 | Auspurg et al. | 364/200 |
| 3,787,818 | 1/1974 | Arnold et al. | 364/200 |
| 3,810,105 | 5/1974 | England | 364/200 |
| 3,921,145 | 11/1975 | Emm et al. | 364/200 |
| 3,959,775 | 5/1976 | Valassis et al. | 364/200 |

*Primary Examiner*—Melvin B. Chapnick
*Attorney, Agent, or Firm*—Oblon, Fisher, Spivak, McClelland & Maier

[57] ABSTRACT

A micro-computer system includes a memory device, a plurality of memory utilization devices such as processors, a bus connected between the memory device and the memory utilization devices for address information and data transfer therebetween, bus control lines, and an access arbitrator for preventing simultaneous accesses of memory utilization devices to the memory device. The bus control lines include two lines for transferring address transfer and write/read control information from one of the memory utilization devices to the memory device and one line for coupling an access acknowledge signal from the memory device to one of the memory utilization devices. The access arbitrator couples the access acknowledge signal to one of the memory utilization devices issuing an access request signal and disables another memory utilization device to issue the address transfer and read/write control information on the two bus control lines.

1 Claim, 9 Drawing Figures

PRIOR ART
FIG. 3
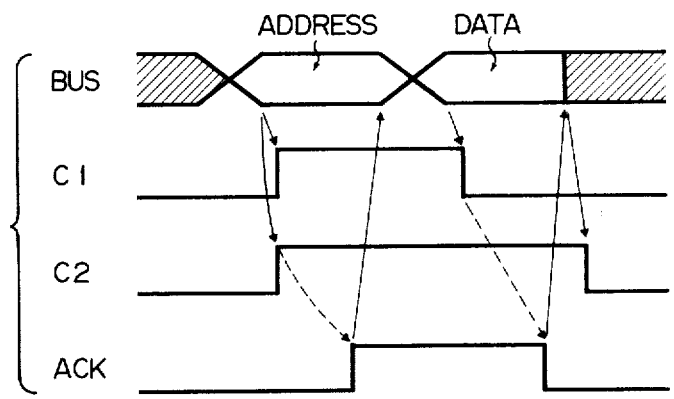
FIG. 5
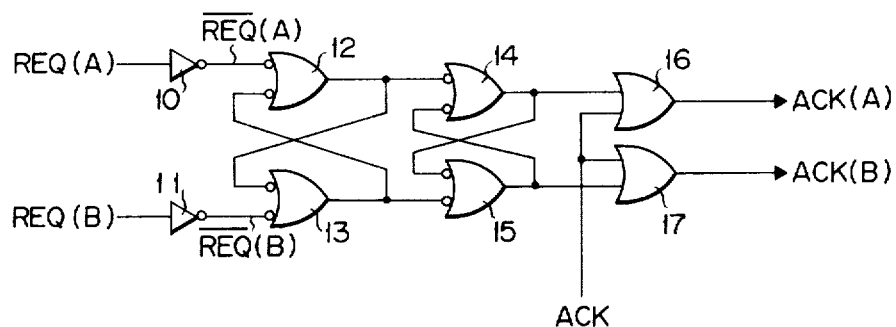
FIG. 6
| REQ(A) | REQ(B) | ACK(A) | ACK(B) |
|---|---|---|---|
| 0 | 0 | PREVIOUS STATE | PREVIOUS STATE |
| 1 | 0 | ACK | 1 |
| 0 | 1 | 1 | ACK |
| 1 | 1 | PREVIOUS STATE | PREVIOUS STATE |

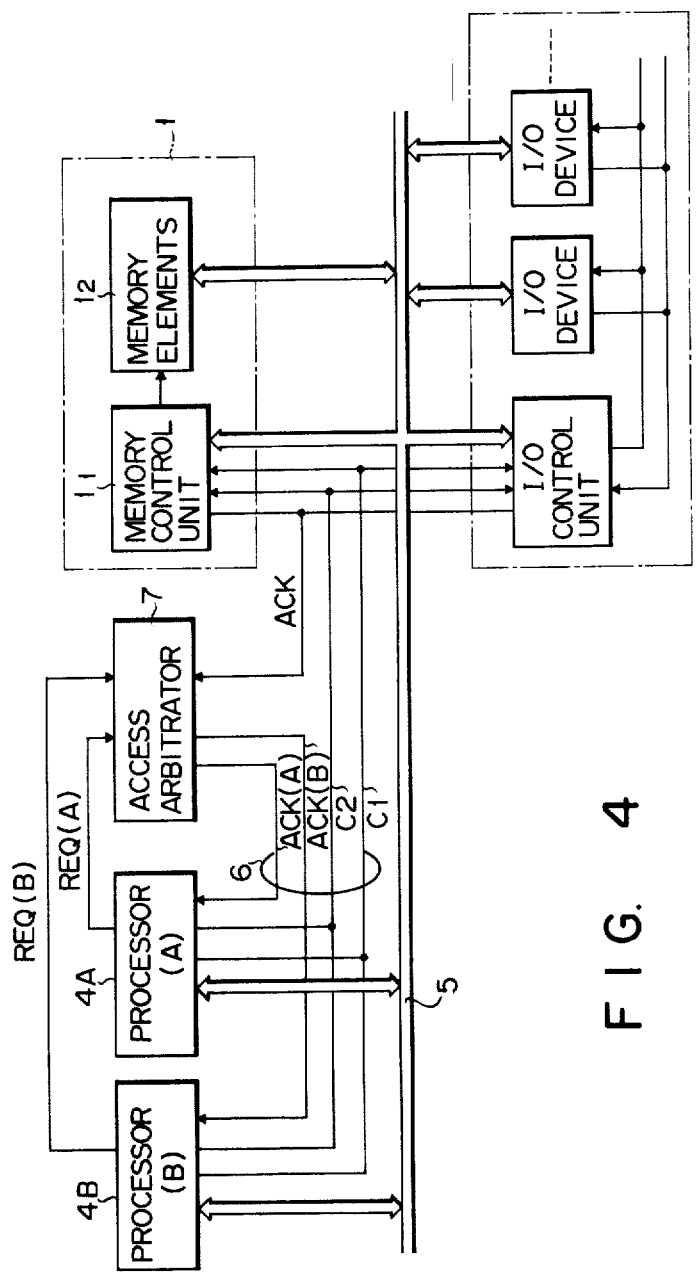
F I G. 4

COMPUTER SYSTEM WITH A MEMORY ACCESS ARBITRATOR

BACKGROUND OF THE INVENTION

This invention relates to an electronic computer system, and more particularly to an access control system for making access to a memory device from a plurality of memory utilization devices in the computer.

Usually in a micro-computer system one processor is connected to one memory device and the access to the memory device is monopolized by the processor. Accordingly, the processor can have an access to the memory device at any time but the memory device is idle while the processor is processing data therein.

Accordingly, if it were possible to efficiently utilize the memory device the efficiency of the overall computer system would be improved. For this reason, it is desirable to further connect an additional processor to the memory device or to further connect a direct memory access control device to the memory device in order to directly transfer data between an input-output device and the memory device. In such system the memory device can be accessed by a plurality of memory utilization devices, but when the memory utilization devices are operating independently, the memory utilization devices may have simultaneous access to the memory device thereby mixing together information or data from the devices. For this reason, it is necessary to properly arrange access requests from a plurality of memory utilization devices for the same memory device.

In order to avoid overlapping of access to the same memory device from a plurality of memory utilization devices it is advantageous to construct the computer system such that only a memory utilization device now requiring an access to the memory device issues an access request, that a right of access is given to the memory utilization device which is issuing an access request, that where a plurality of memory utilization devices simultaneously issues memory access requests, the right of access is given to only one memory utilization device and other memory utilization devices are caused to wait for the next chance. A processor or a direct memory access control device utilized in such an access distributing system is required to be provided with a signal line or a terminal for issuing a memory access request, and a signal line or a terminal for detecting that the memory device has acknowledged the access request.

A processor utilized in a micro-computer is made up of a LSI so that the need for provision of two signal lines or terminals for the access distribution control described above is not desirable.

SUMMARY OF THE INVENTION

It is an object of this invention to provide an improved electronic computer system in which the number of the signal lines connected to memory utilization devices for memory access distribution is reduced.

According to this invention, there is provided a micro-computer system which includes a memory device, a plurality of memory utilization devices such as processors, a bus connected between the memory device and the memory utilization devices for address information and data transfer therebetween, bus control lines, and an access arbitrator for preventing simultaneous accesses of memory utilization devices to the memory device. The bus control lines include two lines for transferring address transfer and write/read control information from one of the memory utilization devices to the memory device and one line for coupling an access acknowledge signal from the memory device to one of the memory utilization devices. The access arbitrator couples the access acknowledge signal to one of the memory utilization devices issuing an access request signal and disables another memory utilization device to issue the address transfer and read/write control information on the two bus control lines.

Thus, according to this invention, since existing bus control lines to control the bus are effectively utilized to transmit an access acknowledge signal from the memory device to the memory utilization devices it is possible to decrease the number of signal lines required to distribute the access signal. Accordingly, each memory utilization device is required to be provided with only one signal line to carry an access request signal for access distribution.

BRIEF DESCRIPTION OF THE DRAWING

In the accompanying drawings:

FIG. 3 shows signal waveforms useful to explain the memory writing operation of the micro-computer system shown in FIG. 1;

FIG. 4 is a block diagram showing one embodiment of a micro-computer system embodying the invention;

FIG. 5 shows a logical circuit of the access arbitrator shown in FIG. 4;

FIG. 6 shows a truth table of the logical circuit shown in FIG. 5;

DESCRIPTION OF THE PREFERRED EMBODIMENTS

Figure 1:
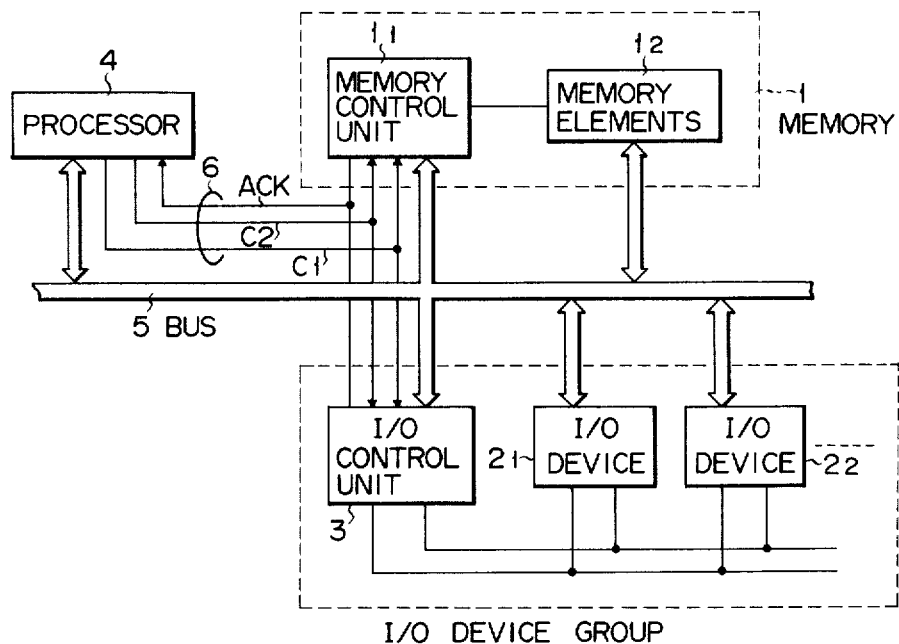
FIG. 1 is a block diagram showing one example of a prior art micro-computer system.

FIG. 1 is a block diagram showing a prior art micro-computer system including a single processor 4 and a single memory device 1. The memory device 1 is constituted by a memory control unit $1_1$ and memory elements $1_2$. Various input-output devices $2(2_1, 2_2 ...)$ are controlled by an input-output control unit 3. Although not shown, the input-output devices $2_1$ and $2_2$ contain input-output interfaces. The relationship between the input-output control unit 3 and respective input-output devices is similar to that between the memory control unit $1_1$ and the memory elements $1_2$. The memory control unit $1_1$, the memory elements $1_2$, the input-output control unit 3, the input-output devices $2_1, 2_2, \ldots$ and a processor 4 are connected to a bus 5 which is accompanied with bus control lines 6 connected to the processor 4, the memory control unit $1_1$, and the input-output control unit 3. The control of the bus is made through the bus control lines 6. Thus, when various devices connected to the bus 5 are transferring data, the respective devices operate in accordance with the states of respective bus control lines 6.

The bus control lines 6 include lines termed $C_1$, $C_2$ and ACK (acknowledge). Lines $C_1$ and $C_2$ are used to transmit control signals to the memory control unit $1_1$ and the input-output control unit 3 from the processor 4. By the combinations of the voltage levels on the lines $C_1$ and $C_2$, address transfer, read and write operations are identified. The line ACK is used to inform from the memory control unit $1_1$ or the input-output control unit 3 to the processor 4 the fact that address data has been received, that a read data is sent to the bus 5 or that a write data has been written.

Figure 2:
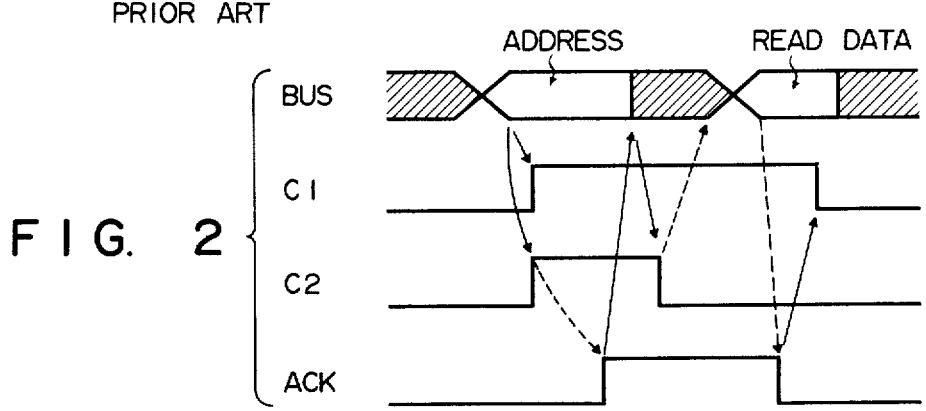
FIG. 2 shows signal waveforms useful to explain the memory reading operation of the micro-computer system shown in FIG. 1.

FIGS. 2 and 3 show the states of the bus control signals and the data on the bus 5 during the read and write operations of the micro-computer system shown in FIG. 1. In FIGS. 2 and 3, shaded areas show that the bus 5 is at a high impedance state (floating) while not shaded areas show the voltage is at "0" or "1" level, that is the low impedance state.

In the micro-computer system shown in FIG. 1, the input-output devices and the memory words are contained in one address space so that the transfer of the data between the processor 4 and the input-output devices is controlled in the same manner as the transfer of the data between the processor 4 and the memory device 1.

The read operation of the processor 4 for reading a word out of the memory device 1 will now be described with reference to FIG. 2.

(1) Firstly, the processor 4 issues an address on the common bus.

(2) When the address is completely issued on the bus 5, the processor 4 simultaneously changes the states of lines $C_1$ and $C_2$ to a high voltage level (logical "1" level) thereby informing to the memory control unit $1_1$ and the input-output control unit the fact that the address presents on the bus 5.

(3) When the states of both lines $C_1$ and $C_2$ become logical "1" level, the memory control unit $1_1$ and the input-output control unit 3 receive the address on the common bus 5 to judge whether the address is under their control or not. In the former case the memory control unit 1 or the input-output control unit 3 memorizes that it has been selected by the processor 4 and change the state of the line ACK to the high voltage level.

(4) When the line ACK is turned to "1" state the processor 4 terminates the address output thus turning the common bus 5 to the high impedance state.

(5) Then, the processor 4 changes the line $C_2$ to the low voltage state thus requesting a read data.

(6) When the state of line $C_2$ changes to "0" level with the states of lines $C_1$ and ACK being "1" level the selected memory control unit $1_1$ reads out the word with the address received immediately before.

(7) When the read out data is issued on the bus 5 the memory control circuit $1_1$ changes the line ACK to the low voltage level state.

(8) When the line ACK is changed to "0" state, the processor 4 receives the read data and turns the line $C_1$ to the low voltage level state thus informing the memory control unit $1_1$ of the reception of the data.

(9) When the line $C_1$ is changed to "0" state, the selected memory control unit $1_1$ terminates the data output thus changing the bus 5 to the high impedance state.

The write operation will now be described with reference to FIG. 3. The steps performed until the address is transferred to the memory device are identical to the steps (1) to (3) of the read operation. Subsequent steps are as follows.

(4') When the line ACK changes to "1" state, the processor 4 terminates the address output and issues a write data on the bus 5.

(5') The processor 4 turns the line $C_1$ to the low voltage level thus informing the memory control unit $1_1$ the fact that the write data has been issued on the bus 5.

(6') When the state of line $C_1$ changes to "0" level with the states of line $C_2$ and ACK being "1" level, the selected memory control circuit $1_1$ writes the data in a memory location having an address just received. When writing of the data is completed state of the line ACK is changed to the low voltage level thus informing the processor 4 the fact that the data has been written in the desired memory location.

(7') When state of the line ACK changes to "0" state the processor 4 terminates the data output thus changing the bus 5 to the high impedance state.

(8') The processor 4 turns the line $C_2$ to the low level.

The sequence of $C_1$ and $C_2$ are determined by a bus controller in the processor in accordance with operation modes designated by mirco-programs.

Where an additional processor or direct memory access controller is connected to the system shown in FIG. 1 the memory device will be accessed by two devices. When these two devices operate independently, it is necessary to control the access distribution so that the accesses may not overlap each other. Such access distribution control circuit will hereinafter be termed an "access arbitrator."

FIG. 4 illustrates one example of this invention including a plurality of memory utilization devices and an access arbitrator in which the elements corresponding to those shown in FIG. 1 are designated by the same reference characters.

Memory utilization devices, that is the processors 4A and 4B in this case that make accesses to the memory device 1 transmit access request signals REQ(A) and REQ(B) to an access arbitrator 7 that permits one memory utilization device to access to the memory device 1.

The access arbitrator 7 may take various configurations depending upon how a preference is given to the overlapping memory access requests. However, FIG. 5 shows one example of a practical circuit for two processors 4A and 4B, and FIG. 6 shows a truth table for this access arbitrator.

The access arbitrator shown in FIG. 5 comprises two inverters 10 and 11 which invert the access request signals $\overline{REQ(A)}$ and $\overline{REQ(B)}$, respectively, a first flip-flop circuit including cross-coupled NAND gate circuits 12 and 13 which are supplied with the inverted access request signals REQ(A) and REQ(B), respectively, a second flip-flop circuit including cross-coupled NAND gate circuits 14 and 15 connected to receive the complementary outputs from the first flip-flop circuit, and first and second OR gate circuits 16 and 17 connected to receive the complementary outputs from the second flip-flop circuit and an ACK signal from the memory device. When the access request signals REQ(A) and REQ(B) are both at "0" level, that is low voltage level or at "1" level, that is high voltage level, the access arbitrator maintains the outputs ACK(A) and ACK(B) respectively at the previous states but when the access request signal REQ(A) is at the "1" level and when the access request signal REQ(B) is at the "0" level, it couples the ACK signal to the ACK(A) output and turns the ACK(B) output to the "1" level. When the REQ(A) signal is at the "0" level and the REQ(B) signal is at the "1" level the ACK(B) output is coupled with the ACK signal and the ACK(A) output is changed to the "1" level.

In a certain type of the existing micro-computer systems, for example Toshiba "TLSC-12A" it is possible to produce the inverted output $\overline{REQ}$ of an access request signal REQ by a NAND gate circuit connected to receive the inverted output $\overline{TC}$ of an output TC which shows that whether a timing generator in the microprocessor is operating or not (when the timing generator is operating the output $\overline{TC}$ is at the "1" level) and an output RS which shows that whether the processor is running or stopped (when the processor is running the output RS is at the "1" level). Thus, the processor issues a memory access request when it is running and the timing generator therein does not operate.

Figure 7:
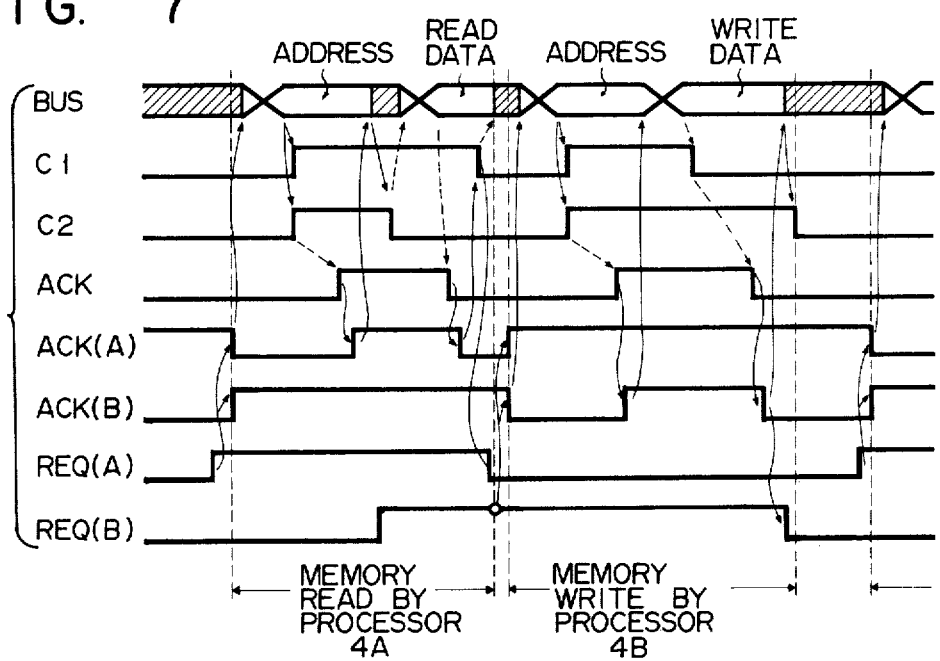
FIG. 7 shows signal waveforms of the micro-computer system shown in FIG. 4.

FIG. 7 shows the relationship among access request signals REQ(A) and REQ(B), bus control signals $C_1$, $C_2$, ACK, ACK(A) and ACK(B), and the data on the bus of the system shown in FIG. 4 including the access arbitrator shown in FIG. 5. After the processor 4B has made an access to the memory device 1 and when both processors 4A and 4B do not issue a memory access request, that when both signals REQ(A) and REQ(B) are at the low voltage level, signals $C_1$, $C_2$ and ACK are at the low voltage level, the signal ACK(A) at the high voltage level, the signal ACK(B) at the low voltage level, and the bus is at a high impedance state.

When the processor 4A issues a memory access request, that is when the output REQ(A) is at the high voltage level, the access arbitrator 7 turns the ACK(B) output to the high voltage level and couples signal ACK to the ACK(A) output. As soon as the ACK(A) output becomes low level, processor 4A makes an access to the memory device in the same manner as above described. For example, at this time, when the memory reference is a read mode the signal states vary as shown on the lefthand half of FIG. 7 which is identical to FIG. 2.

While the processor 4A makes reference to the memory device 1 when the processor 4B turns the signal REQ(B) to the high voltage level, in other words when the processor 4B issues a memory access request, the access arbitrator 7 will not change the state of its output because the arbitrator has already authorized the processor 4A to make access to the memory device 1 and because the processor 4A is now making such access. On the other hand the processor 4B does not commence to make access to the memory device 1 because the output ACK(B) of arbitrator is at the high voltage level. Thus, the bus connecting terminals and the $C_1$ and $C_2$ terminals of the processor 4B are maintained at high impedance states.

When the reference of the processor 4A to the memory device 1 terminates thereby returning signal REQ(A) to the low voltage level, the access arbitrator 7 immediately changes the output ACK(A) to the high voltage level and couple ACK to the output ACK(B) thus authorizing the processor 4B to make access to the memory device 1. Consequently, as soon as the signal ACK(B) changes to the low voltage level, the processor 4B begins to make access to the memory device 1. When the memory reference of the processor 4B is a write mode, the signal states change as shown on the righthalf of FIG. 7 which is similar to FIG. 3.

When the processor 4B terminates reference to the memory device 1 thereby returning the signal REQ(B) to the low voltage level the access arbitrator 7 maintains the output ACK(A) at the high voltage level and the output ACK(K) at the low voltage level so long as no memory access request is made from the other device. When the processor 4A issues an access request, the access arbitrator 7 changes the output ACK(B) to the high voltage level and the output ACK(A) to the low voltage level thus authorizing the processor 4A to make an access.

In the embodiment described above, the access arbitrator equally handles processors 4A and 4B so as to give the right of access to one processor which makes an access earlier than the other. The access request is held by each processor and ceased when the memory reference is over. Although in the example shown in FIG. 7, the access request is ceased at each memory reference, when the request is continued, the device continues to maintain its right of access. This holding of the access request may be made by the access arbitrator, in which case the access arbitrator is required to know the proceeding of the bus operation while watching the states of the control signals $C_1$ and $C_2$.

Figure 9:
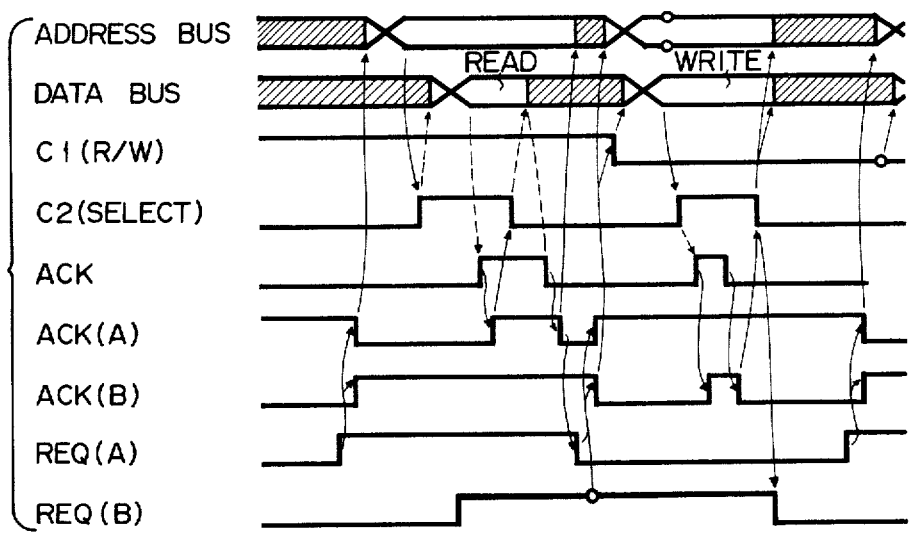
FIG. 9 shows signal waveforms useful to explain the operation of the modified embodiment shown in FIG. 8.
Figure 8:
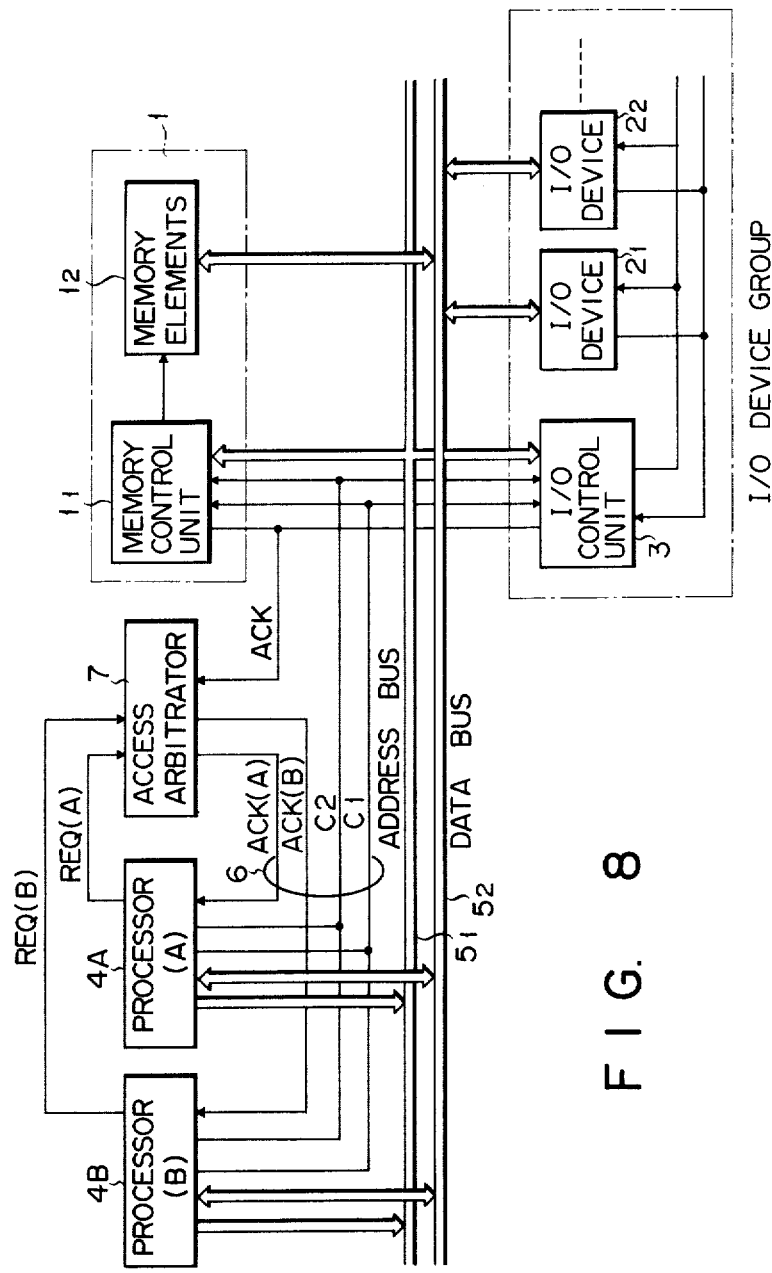
FIG. 8 is a block diagram showing a modified embodiment of this invention.

In the system shown in FIG. 4, two processors are connected to the memory device through a single bus. However, it should be understood that the invention is not limited to the number of the memory utilization devices and the construction of the bus. Furthermore, while in the foregoing embodiment the address and data are transmitted through the same bus even in a system wherein independent address bus $5_1$ and a data bus $5_2$ are provided as shown in FIG. 8 the distribution and control of the access requests can be made in the same manner as above described. FIG. 9 shows the variation of respective signals of the system shown in FIG. 8.

In the embodiments described above, the same control may be made even when the memory control unit $1_1$ or the input-output control unit 3 may be included in the memory element $1_1$ or in the input-output devices $2_1$ or $2_2$. Further, independent read data bus and write data bus may provided, if desired.

In a system wherein the memory bus is controlled synchronously, the memory access device issues an access request signal, and when authorized, produces a read/write signal and an access commencement or selection signal. The memory device is constructed to produce a busy signal showing that it is in an access condition or a ready signal showing that the memory can transmit or receive data. The busy or ready signal corresponds to the aforementioned ACK signal. Where a plurality of independently operable devices make accesses to a single memory device it is necessary to provide an asynchronous control device. The invention is also applicable to this case.

In a system wherein a plurality of devices each making an access to a memory device have independent busses and the busses are connected to the memory through a multiplexer or in a system including a multi-port memory device it is possible to drive busses at the same time when memory utilization devices issue access requests. In such a system, the system of this invention may be used for performing other processings until the access request is acknowledged.

Where a register of an input-output device is allotted a memory address and the input-output device is handled as a memory word an access for the input-output device is made in the same manner as the access to the memory device. Even when input-output numbers are allotted to plurality of input-output devices which are different from that of a memory device, an input-output device can be accessed in the same manner as a single memory device.

In the above description, an assumption is made that each of the bus control signals $C_1$, $C_2$ and ACK is a driver output having three states, and to each of the bus control lines is connected with a pull-down resistor. Since these signals are unidirectional it is possible to use an OR gate circuit utilizing two-state outputs.

What is claimed is:

1. A computer system comprising:

memory means having first and second terminals for reception of address transfer and read/write control information and a third terminal, and means for switching the voltage level at the third terminal from a first voltage level to a second voltage level representative of access acknowledge during the time from reception of address information to issuance of read data or reception of write data;

first and second memory utilization devices each having first, second, third and fourth terminals and each having a memory access acknowledged by variation of voltage level at its third terminal from the first voltage level to the second voltage level, each memory utilization device being responsive to the first voltage level at its third terminal after issuance of a memory request signal on its fourth terminal to cause its first and second terminals to assume voltage levels representative of address transfer and responsive to the second voltage level at its third terminal to cause its first and second terminals to assume voltage levels representative of data request or data issuance;

bus means connected between the memory means and the first and second memory utilization devices for address and data transfer;

means coupling the first and second terminals of each memory utilization device to the first and second terminals of the memory means, respectively; and means connected to the third and fourth terminals of each memory utilization device and the third terminal of the memory means for retaining the third terminal of one of the first and second memory utilization devices at the second voltage level for the time during which the other memory utilization device is acquiring access to the memory means.

* * * * *